(12) United States Patent
Kim et al.

(10) Patent No.: US 11,890,906 B2
(45) Date of Patent: Feb. 6, 2024

(54) VEHICLE SUSPENSION SPRING DEVICE AND VEHICLE SUSPENSION SYSTEM HAVING THE SAME

(71) Applicants: HYUNDAI MOTOR COMPANY, Seoul (KR); KIA CORPORATION, Seoul (KR); KOLONGLOTECH. INC, Seoul (KR); HYUNDAI MOBIS CO., LTD., Seoul (KR)

(72) Inventors: Hyun Soo Kim, Anyang-si (KR); Jae Hun Kim, Hwaseong-si (KR); Young Ha Kim, Yongin-si (KR); Woo Bin Song, Yongin-si (KR); Dong Won Kim, Gimpo-si (KR); Jun Sung Goo, Suwon-si (KR)

(73) Assignees: HYUNDAI MOTOR COMPANY, Seoul (KR); KIA CORPORATION, Seoul (KR); KOLONGLOTECH. INC, Seoul (KR); HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/986,599

(22) Filed: Nov. 14, 2022

(65) Prior Publication Data
US 2023/0166573 A1  Jun. 1, 2023

(30) Foreign Application Priority Data
Dec. 1, 2021 (KR) .......................... 10-2021-0170337

(51) Int. Cl.
*B60G 11/08* (2006.01)
*F16F 1/368* (2006.01)
(Continued)

(52) U.S. Cl.
CPC ................ *B60G 11/08* (2013.01); *B60G 3/10* (2013.01); *B60G 7/001* (2013.01); *F16F 1/3683* (2013.01)

(58) Field of Classification Search
CPC . B60G 11/08; B60G 3/10; B60G 7/001; F16F 1/3683
See application file for complete search history.

(56) References Cited

U.S. PATENT DOCUMENTS 403,885 A * 5/1889 Hironimus ............. B60G 21/05
267/193
1,194,303 A * 8/1916 McAnulty .............. B60G 11/08
267/41

(Continued)

FOREIGN PATENT DOCUMENTS

JP  S464483 Y1  2/1971
JP  H058625 A   1/1993
(Continued)

*Primary Examiner* — Paul N Dickson
*Assistant Examiner* — Timothy Wilhelm
(74) *Attorney, Agent, or Firm* — Lempia Summerfield Katz LLC

(57) ABSTRACT

Disclosed are a vehicle suspension spring device and a vehicle suspension system having the same. The vehicle suspension spring device includes a leaf spring unit comprising at least one leaf spring disposed in a lateral direction of a vehicle, a pair of first coupling parts provided at opposite ends of the leaf spring unit in a longitudinal direction and rotatably coupled to a pair of axles on which opposite wheels of the vehicle are mounted, and a pair of second coupling parts provided at two points between the opposite ends of the leaf spring unit in the longitudinal direction to be rotatably coupled to a subframe of the vehicle.

8 Claims, 9 Drawing Sheets

(51) Int. Cl.
*B60G 7/00* (2006.01)
*B60G 3/10* (2006.01)

(56) References Cited

U.S. PATENT DOCUMENTS

| | | | | | |
|---|---|---|---|---|---|
| 1,292,166 | A * | 1/1919 | Voight | ............... | B60G 11/08 |
| | | | | | 267/244 |
| 1,328,601 | A * | 1/1920 | Spring | ............... | B60G 11/08 |
| | | | | | 267/244 |
| 2,072,156 | A * | 3/1937 | Cooke | ............... | B60G 11/08 |
| | | | | | 267/45 |
| 2,126,130 | A * | 8/1938 | Nallinger | ............... | B60G 11/08 |
| | | | | | 280/124.165 |
| 2,236,522 | A * | 4/1941 | Cook | ............... | B60G 11/08 |
| | | | | | 267/193 |
| 3,197,190 | A * | 7/1965 | Miyashiro | ............... | F16F 3/02 |
| | | | | | 280/124.171 |
| 3,917,306 | A * | 11/1975 | Madler | ............... | B60G 21/04 |
| | | | | | 280/124.109 |
| 4,029,331 | A * | 6/1977 | Obearle | ............... | B60G 11/34 |
| | | | | | 280/124.171 |
| 4,288,096 | A * | 9/1981 | Enokimoto | ............ | B60G 11/113 |
| | | | | | 280/124.171 |
| 4,422,666 | A * | 12/1983 | Proctor | ............... | B62D 17/00 |
| | | | | | 280/124.171 |
| 4,557,500 | A * | 12/1985 | Collard | ............... | B60G 15/06 |
| | | | | | 280/124.171 |
| 4,768,807 | A * | 9/1988 | McGibbon | ............ | F16F 1/3686 |
| | | | | | 267/269 |
| 4,869,472 | A * | 9/1989 | de Goncourt | ......... | B60G 11/08 |
| | | | | | 267/260 |
| 4,887,841 | A * | 12/1989 | Cowburn | ............... | B60G 11/08 |
| | | | | | 280/124.171 |
| 4,889,361 | A * | 12/1989 | Booher | ............... | F16F 1/368 |
| | | | | | 280/686 |
| 5,016,861 | A * | 5/1991 | Thompson | ............... | F16F 1/18 |
| | | | | | 267/52 |
| 5,141,209 | A * | 8/1992 | Sano | ............... | F16F 1/3686 |
| | | | | | 267/260 |
| 5,251,930 | A * | 10/1993 | Kusaka | ............... | B60G 11/08 |
| | | | | | 267/260 |
| 5,547,207 | A * | 8/1996 | Madler | ............... | B60G 21/067 |
| | | | | | 180/24.08 |
| 5,826,896 | A * | 10/1998 | Baumann | ............... | B60G 11/10 |
| | | | | | 280/124.171 |
| 6,029,987 | A * | 2/2000 | Hoffman | ............... | B60G 11/10 |
| | | | | | 267/260 |
| 6,189,904 | B1 * | 2/2001 | Gentry | ............... | F16F 1/368 |
| | | | | | 267/47 |
| 6,390,486 | B1 * | 5/2002 | Boes | ............... | B60G 11/08 |
| | | | | | 280/124.171 |
| 7,246,808 | B2 * | 7/2007 | Preijert | ............... | B60G 5/04 |
| | | | | | 280/124.17 |
| 8,485,543 | B2 * | 7/2013 | Richardson | ............ | B62D 7/08 |
| | | | | | 280/124.167 |
| 8,777,248 | B2 * | 7/2014 | Perri | ............... | B60G 11/08 |
| | | | | | 280/124.171 |
| 9,073,400 | B2 * | 7/2015 | Perri | ............... | B60G 7/008 |
| 9,421,837 | B2 * | 8/2016 | Lake | ............... | B60G 15/06 |
| 9,656,528 | B2 * | 5/2017 | Perri | ............... | B60G 15/068 |
| 10,618,365 | B2 * | 4/2020 | Higle | ............... | B60G 11/08 |
| 10,889,154 | B2 * | 1/2021 | Winter | ............... | B60G 11/42 |
| 11,338,636 | B2 * | 5/2022 | Winter | ............... | B60G 11/08 |
| 11,358,426 | B2 * | 6/2022 | Rosenmeyer | ......... | B60G 11/08 |
| 11,660,923 | B2 * | 5/2023 | Kim | ............... | F16F 1/3835 |
| | | | | | 280/682 |
| 2013/0241167 | A1 * | 9/2013 | Perri | ............... | B60G 11/10 |
| | | | | | 280/124.134 |
| 2019/0126705 | A1 * | 5/2019 | Schramm | ............... | B60G 11/08 |
| 2019/0329619 | A1 * | 10/2019 | Rupflin | ............... | B60G 11/08 |
| 2021/0379948 | A1 * | 12/2021 | Rosenmeyer | ......... | B60G 11/08 |
| 2022/0363101 | A1 * | 11/2022 | Kim | ............... | B60G 11/10 |
| 2023/0008533 | A1 * | 1/2023 | Song | ............... | B60G 11/08 |
| 2023/0020086 | A1 * | 1/2023 | Song | ............... | B60G 11/08 |

FOREIGN PATENT DOCUMENTS

| | | |
|---|---|---|
| JP | 2010247673 A | 11/2010 |
| KR | 19990015072 A | 3/1999 |
| KR | 100281822 B1 | 2/2001 |
| KR | 20180120729 A | 11/2018 |

* cited by examiner

VEHICLE SUSPENSION SPRING DEVICE AND VEHICLE SUSPENSION SYSTEM HAVING THE SAME

CROSS-REFERENCE TO RELATED APPLICATION(S)

This application is based on and claims priority under 35 U.S.C. § 119 to Korean Patent Application No. 10-2021-0170337, filed on Dec. 1, 2021, in the Korean Intellectual Property Office, the disclosure of which is incorporated by reference herein in its entirety.

BACKGROUND

1. Field

The present disclosure relates to a vehicle suspension spring device that absorbs vibrations transmitted to a vehicle body depending on driving of the vehicle, and a vehicle suspension system having the same.

2. Description of the Related Art

A suspension device applied to a vehicle is installed between a vehicle body and a wheel and serves to absorb vibrations transmitted to the vehicle body depending on driving of the vehicle (i.e., depending on driving conditions and/or how the vehicle is driven).

In general, a suspension device may include a buffer, a stabilizer bar for suppressing rolling of the vehicle, and a link connecting a wheel and a vehicle body.

In most cases, a plurality of the links connects an axle mounted on the wheel, such as a lower arm and an upper arm, and a subframe of the vehicle body. The buffer and stabilizer bar are typically installed through the lower arm to support the vehicle body. As the buffer, a coil spring and a shock absorber are mainly used.

In a structure of such a general vehicle suspension device, as the coil spring is installed in a vertical direction to support a floor of the vehicle body, the coil spring may act as a hindrance factor in lowering a floor height of the vehicle body so that an interior space of a vehicle is more widely secured.

In addition, because the overall structure of the suspension device of a vehicle in which the axle and the subframe are connected through a plurality of the links is complicated, there is a high possibility that the stabilizer bar and the shock absorber may interfere with the links during installation.

SUMMARY

It is an aspect of the present disclosure to provide a vehicle suspension spring device capable of lowering a height of a floor of a vehicle body, and a vehicle suspension system having the same.

It is another aspect of the present disclosure to provide a vehicle suspension spring device capable of having a simplified configuration while effectively performing a vibration-absorbing action, and a vehicle suspension system having the same.

Additional aspects of the present disclosure are set forth in part in the description that follows and, in part, should be apparent from the description, or may be learned by practice of the disclosure.

In accordance with an aspect of the present disclosure, a vehicle suspension spring device includes a leaf spring unit comprising at least one leaf spring disposed in a lateral direction of a vehicle, a pair of first coupling parts provided at opposite ends of the leaf spring unit in a longitudinal direction and rotatably coupled to a pair of axles on which opposite wheels of the vehicle are mounted, and a pair of second coupling parts provided at two points between the opposite ends of the leaf spring unit in the longitudinal direction to be rotatably coupled to a subframe of the vehicle.

The leaf spring unit may include a plurality of leaf springs connected in the lateral direction of the vehicle. A first coupling part of the pair of first coupling parts may be provided at an outer end of an outermost leaf spring of the plurality of leaf springs. A second coupling of the pair of second coupling parts part may be provided between the plurality of leaf springs.

The leaf spring unit may include a connection part provided to connect the plurality of leaf springs. The connection part may include a pair of connection members provided at ends of the plurality of leaf springs corresponding to each other and coupled to each other. The vehicle suspension spring device may further include an elastic body provided to elastically support the connection members in a front-rear direction of the vehicle.

The connection part may further include a fastening member for coupling the connection members, the fastening member may be fastened in the front-rear direction of the vehicle to couple the connection members, and the elastic body may include a rubber bushing installed in the connection part to support the fastening member.

A rotation shaft may be coupled to the subframe in the front-rear direction of the vehicle. The second coupling part may include a rubber bushing provided to rotatably support the rotation shaft, and a bushing coupling hole provided on the leaf spring unit so that the rubber bushing is coupled. The rubber bushing may elastically support the leaf spring unit around the bushing coupling hole and the subframe.

The leaf spring unit may include a pair of first leaf springs disposed at the opposite ends in the longitudinal direction, and a second leaf spring provided to connect the pair of first leaf springs. The first coupling part may be provided at an outer end of the second leaf spring, and the second coupling part may be provided between the first leaf spring and the second leaf spring.

The leaf spring may be made of a fiber-reinforced composite material.

In accordance with another aspect of the disclosure, a vehicle suspension system includes a subframe of a vehicle, a pair of axles mounted on opposite wheels of the vehicle, and a vehicle suspension spring device provided to connect the pair of axles and the subframe. The vehicle suspension spring device includes a leaf spring unit including a pair of first leaf springs and a second leaf spring provided to connect the pair of first leaf springs and disposed in a lateral direction of the vehicle. The vehicle suspension spring device further includes a pair of first coupling parts provided at outer ends of the pair of first leaf springs to be rotatably coupled to the axle, and a pair of second coupling parts provided between the first leaf springs and the second leaf spring to be rotatably coupled to the subframe.

The leaf spring unit may include a pair of connection parts provided to connect the first leaf springs and the second leaf spring. A connection part of the pair of connection parts may include a pair of connection members provided at ends of the first leaf spring and the second leaf spring corresponding to each other and coupled to each other. The vehicle suspension system may further include an elastic body provided to elastically support the connection members in a front-rear direction of the vehicle.

The connection part may further include a fastening member for coupling the connection members. The fastening member may be fastened in the front-rear direction of the vehicle to couple the connection members, and the elastic body may include a first rubber bushing installed in the connection part to support the fastening member.

A rotation shaft may be coupled to the subframe in the front-rear direction of the vehicle. The second coupling part may include a second rubber bushing provided to rotatably support the rotation shaft, and a bushing coupling hole provided on the connection part so that the second rubber bushing is coupled.

The second rubber bushing may be provided at a central portion of the connection part, and a plurality of the first rubber bushings may be provided in the connection part around the second rubber bushing.

The second rubber bushing elastically may support the connection part around the bushing coupling hole and the subframe.

The first coupling part may be coupled to a lower central portion of the axle.

The leaf spring unit may include a pair of connection parts provided to connect the pair of first leaf springs and the second leaf spring. The subframe may include a cross member formed in the lateral direction of the vehicle. The cross member may have a hollow portion therein along a longitudinal direction, and the vehicle suspension spring device may be provided such that the pair of connection parts and a gap between the pair of connection parts are accommodated in the hollow portion.

BRIEF DESCRIPTION OF THE DRAWINGS

These and/or other aspects of the disclosure should become apparent and more readily appreciated from the following description of the embodiments, taken in conjunction with the accompanying drawings of which.

DETAILED DESCRIPTION

Hereinafter, an embodiment of the present disclosure is described in detail with reference to the accompanying drawings. The embodiment described below are provided by way of example so that those having ordinary skill in the art should be able to fully understand the spirit of the present disclosure, and the present disclosure is not limited to the embodiments described below, and may be embodied in other forms. In order to clearly explain the present disclosure, parts not related to the description are omitted from the drawings, and the size of the components may be exaggerated for convenience.

Figure 1:
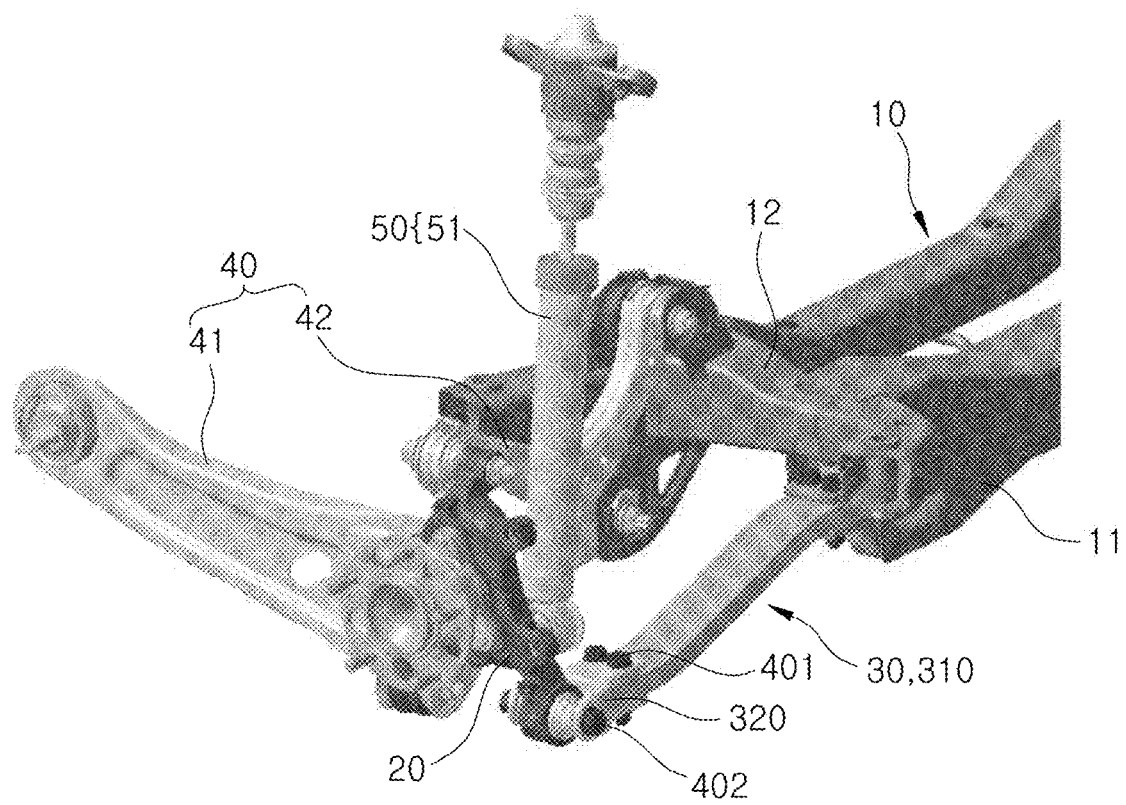
FIG. 1 is a perspective view of a main part of a vehicle suspension system according to an embodiment of the present disclosure.
Figure 2:
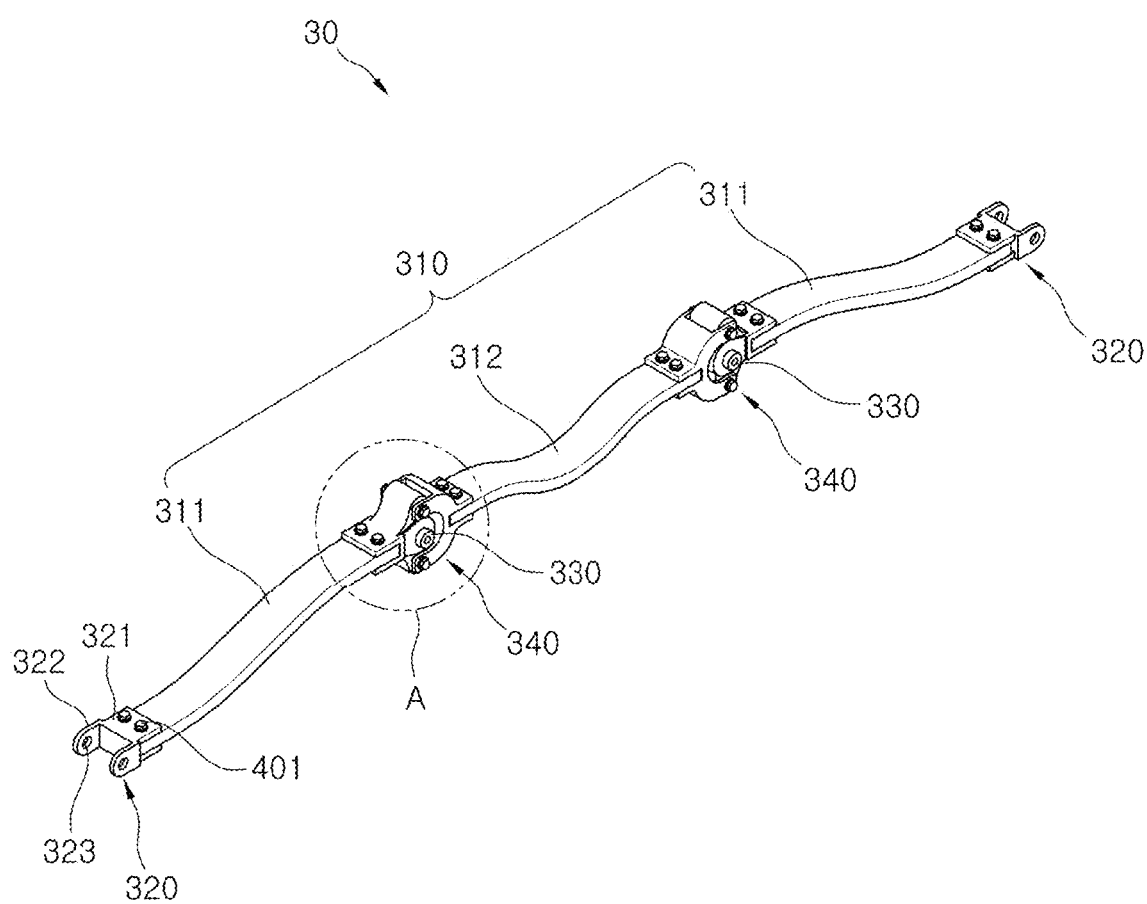
FIG. 2 is a perspective view of a vehicle suspension spring device according to an embodiment of the present disclosure.
Figure 3:
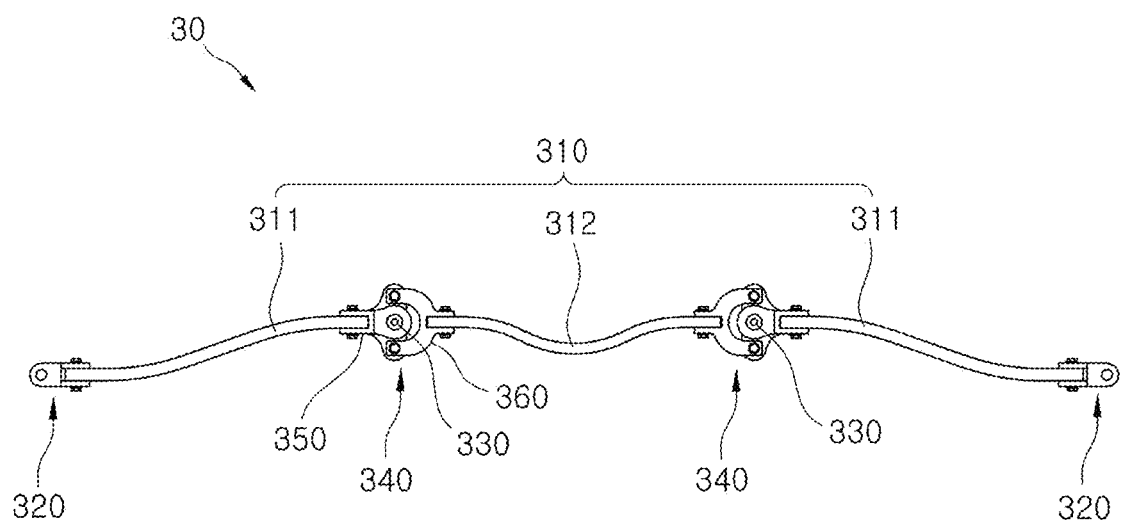
FIG. 3 is a front view of the vehicle suspension spring device according to an embodiment of the present disclosure.
Figure 4:
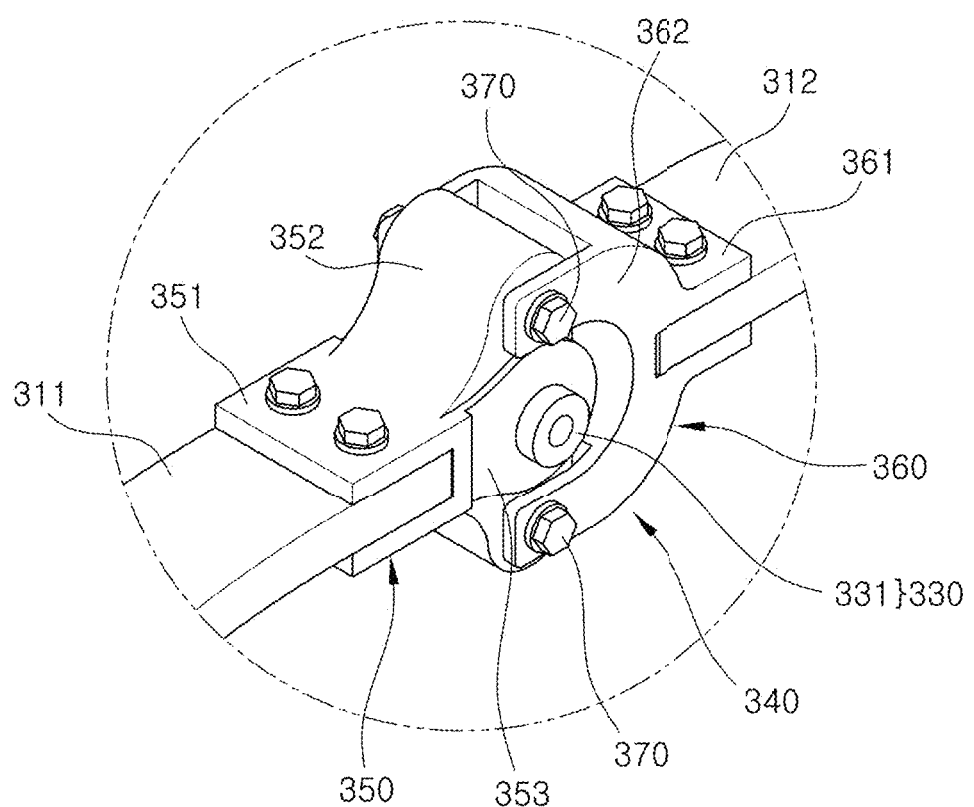
FIG. 4 is an enlarged view of part 'A' in FIG. 2.
Figure 5:
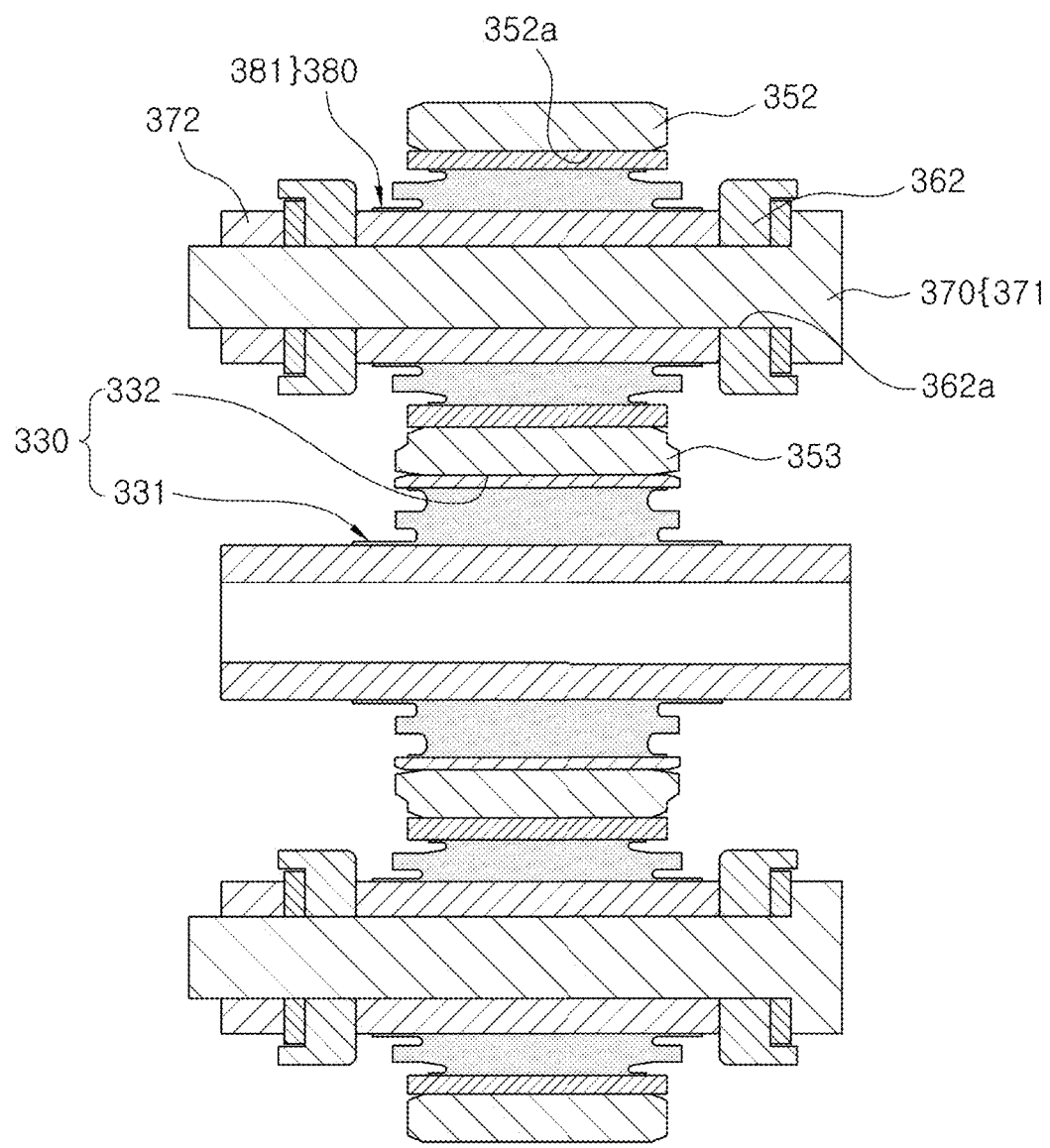
FIG. 5 is a cross-sectional view illustrating a structure of a second coupling part and a connection part in the vehicle suspension spring device according to an embodiment of the present disclosure.

As illustrated in FIG. 1, a vehicle suspension system according to an embodiment of the present disclosure includes a subframe 10 of a vehicle, a pair of axles 20 on which wheels on opposite sides of the vehicle are mounted, a vehicle suspension spring device 30 to connect the pair of axles 20 and the subframe 10, a link member 40 connected to the axle 20 and the subframe 10 to perform a link action, and a buffer 50.

The subframe 10, which is a part of a frame of the vehicle, may be disposed at a lower portion of a vehicle body between the wheels. The subframe 10 may include a cross member 11 formed in a lateral direction of the vehicle and a side member 12 formed in a front-rear direction of the vehicle.

The pair of axles 20 on which the wheels on the opposite sides are mounted may be connected to the subframe 10 through the vehicle suspension spring device 30.

The link member 40 may include a trailing arm 41 to connect the vehicle body and the axle 20, and an upper arm 42 to connect an upper central portion of the axle 20 and the subframe 10.

When the vehicle suspension system is to be implemented in a multi-link type, an arm for performing the link action may be further added between the axle 20 and the subframe 10. The link member 40 may further include the arm added as described above.

The buffer 50 includes a shock absorber 51. The shock absorber 51 may be provided to support between the axle 20 and the vehicle body.

The vehicle suspension system may be used to perform a buffer action of front or rear wheels of the vehicle. As the vehicle suspension system may be used for the front wheel or the rear wheel, the configuration or arrangement of the link member and the buffer 50 may vary.

The vehicle suspension spring device 30 may include a leaf spring unit 310 disposed in the lateral direction of the vehicle, a pair of first coupling parts 320 coupled to the axle 20, and a pair of second coupling parts 330 coupled to the subframe 10.

As illustrated in FIGS. 1-4, the leaf spring unit 310 may be disposed in the lateral direction of the vehicle by including a pair of first leaf springs 311 and a second leaf spring 312 connecting the pair of first leaf springs 311.

The pair of first coupling parts 320 may be provided at outer ends of the pair of first leaf springs 311 to be rotatably coupled to the axle 20. The pair of second coupling parts 330 may be provided between the first leaf springs 311 and the second leaf spring 312 to be rotatably coupled to the subframe 10.

Each of the first coupling parts 320 may include a body 321 coupled to the outer end of the respective first leaf springs 311. Each of the first coupling parts 320 may also include a pair of fastening pieces 322 extending from the body 321 so that fastening holes 323 are formed therein (i.e., a fastening hole 323 is formed in each of the fastening pieces 322). The body 321 may be coupled to the first leaf spring 311 through a fastening member 401, and the first coupling part 320 may be rotatably coupled to the axle 20 in a vertical direction through a hinge pin 402 fastened to each of the pair of fastening pieces 322.

The leaf spring unit 310 may include a pair of connection parts 340 connecting the first leaf springs 311 and the second leaf spring 312. Each of the second coupling parts 330 may include a rubber bushing 331 provided in the connection part 340 and a bushing coupling hole 332 provided in the connection part 340 so that the rubber bushing 331 is coupled thereto.

As illustrated in FIGS. 4-7, a rotation shaft 13, which is described below, is coupled to the subframe 10, and the rubber bushing 331 may be fitted around the rotation shaft 13 to rotatably support the rotation shaft 13.

Accordingly, the first leaf springs 311 may be elastically bent upward or downward with respect to the second coupling parts 330 in response to movement of the wheel in the vertical direction in a state of connecting the wheels and the subframe 10 through the first coupling parts 320 and the second coupling parts 330, thereby performing the link action and a vibration-absorbing action at the same time.

The first leaf springs 311 performing the link action may replace the link member connecting the axle 20 and the subframe 10. The first coupling parts 320 may be coupled to a lower central portion of the axle 20 so that the first leaf springs 311 may replace the lower arms by connecting the lower central portion of the axle 20 and the subframe 10. Accordingly, the vehicle suspension spring device 30 may allow the lower arms to be removed.

The first leaf springs 311 for absorbing vibrations of the wheels may assist a function of the buffer 50. In addition, the first leaf springs 311 may replace a coil spring that is installed in the vertical direction to absorb vibrations between the vehicle body and the wheel by absorbing the vibrations caused by the movement of the wheel in the vertical direction. Accordingly, the vehicle suspension spring device 30 may effectively absorb the vibrations caused by the movement of the wheel in the vertical direction while removing the coil spring that may be added as the buffer 50.

The vehicle suspension system in which a coil spring is replaced by a first leaf spring 311 may contribute to securing a wider space inside the vehicle by lowering the height of the floor of the vehicle body that has been supported by the coil spring.

In addition, the second leaf spring 312 integrally connecting the pair of first leaf springs 311 may replace a stabilizer bar. Therefore, as the vehicle suspension spring device 30 is configured such that the first leaf springs 311 that may replace the lower arms and the coil springs and the second leaf spring 312 that may replace the stabilizer bar are formed as one body, the vehicle suspension spring device 30 may contribute to simplifying the overall configuration of the vehicle suspension system.

Although the above-described embodiment exemplifies a case in which the leaf spring unit 310 of the vehicle suspension spring device 30 is composed of three leaf springs, the number of leaf springs constituting the leaf spring unit 310 is not limited thereto.

In other words, the leaf spring unit 310 may be provided to include a pair of the first coupling parts 320 and a pair of the second coupling parts 330 and to include one or three or more of a plurality of leaf springs within a range in which the leaf spring unit 310 may be provided to behave like a single leaf spring as a whole.

For example, the leaf spring unit 30 may be provided to include one long leaf spring. In this case, a pair of the first coupling parts 320 may be provided at opposite ends of the leaf spring unit 30 to be rotatably coupled to the wheels, and a pair of the second coupling parts 330 may be provided at two points between the opposite ends of the leaf spring unit 30 in a longitudinal direction to be rotatably coupled to the subframe 10.

In addition, the leaf spring unit 30 may be provided to include three or more leaf springs. In this case, the pair of first coupling parts 320 may be provided at outer ends of the outermost leaf springs, respectively, and the pair of second coupling parts 330 may be provided between the leaf springs located inside.

The leaf springs 311 and 312 may be provided through a fiber-reinforced composite material. The fiber-reinforced composite material, which is a material composed of a combination of at least two or more materials, refers to a material having a structure in which a reinforcing material such as glass and carbon fiber is impregnated in a base material such as resin.

The leaf springs 311 and 312 made of the fiber-reinforced composite material have a relatively small weight while satisfying the same level of rigidity as compared with a leaf spring made of a metal material, thereby contributing to increasing fuel reduction effect due to the weight reduction of the vehicle body.

The leaf springs 311 and 312 including a fiber component are provided to take the shape of a long and thin plate, and thus may have elasticity to be advantageous for shock absorption.

The connection part 340 of the leaf spring unit 310 may include a pair of connection members 350 and 360 provided at ends of the first and second leaf springs 311 and 312 corresponding to each other to be interconnected.

The connection members 350 and 360 may include the first connection member 350 coupled to the end of the first leaf spring 311, and the second connection member 360 coupled to the end of the second leaf spring 312.

The first connection member 350 may include a first body 351 coupled to an inner end of the first leaf spring 311, and a first fastening part 352 extending from the first body 351.

The second connection member 360 may include a second body 361 coupled to an outer end of the second leaf spring 312, and a second fastening part 362 extending from the second body 361.

The first connection member 350 and the second connection member 360 may be coupled to each other through the first fastening part 352 and the second fastening part 362 to constitute the connection part 340.

The first connection member 350 further includes a central portion 353 forming the center of the connection part 340. The first fastening part 352 and the second fastening part 362 may be provided to be mutually supported on opposite sides around the central portion 353.

The connection part 340 further includes a fastening member 370 for coupling the first connection member 350 and the second connection member 360. The first connection member 350 and the second connection member 360 may be coupled to each other through the fastening member 370 fastened to the first fastening part 352 and the second fastening part 362. A plurality of the fastening members 370 may be fastened to the first fastening part 352 and the second fastening part 362 so that rotation between the first connection member 350 and the second connection member 360 is limited. A fastening direction of the fastening member 370 for coupling the connection members 350 and 360 may be the front-rear direction of the vehicle or a running direction of the vehicle.

The second coupling part 330 may be provided at a central portion of the connection part 340 to be stably rotatably coupled to the subframe 10. In other words, the rubber bushing 331 and the bushing coupling hole 332 constituting the second coupling part 330 may be provided in the central part 353 of the first connection member 350 at a position corresponding to the center of the connection part 340. Therefore, the second coupling part 330 is provided in the center of the connection part 340, and the fastening member 370 may be fastened to a plurality of positions around the second coupling part 330 to couple the first connection member 350 and the second connection member 360. A pair of the fastening members 370 may be disposed on opposite sides of a circumference of the second coupling part 330.

The positions of the first connection member 350 and the second connection member 360 may be arranged opposite to the above-described form so that the first connection member 350 is coupled to the second leaf spring 312 side, and the second connection member 360 is coupled to the first leaf spring 311 side.

The vehicle suspension spring device 30, which is for absorbing vibrations depending on motion of the wheels in the front-rear direction, may include an elastic body 380 provided to elastically support the connection members 350 and 360 constituting the connection part 340 in the front-rear direction of the vehicle.

The elastic body 380 may include a rubber bushing 381 installed on the connection part 340 to support the fastening member 370. The rubber bushing 381 may form a first rubber bushing, and the rubber bushing 331 of the second coupling part 330 may be a second rubber bushing.

The fastening member 370 may include a bolt 371 fastened to the first fastening part 352 and the second fastening part 362. The bolt 371 fastened to the first fastening part 352 and the second fastening part 362 may be fixed to the connection part 340 through a nut 372.

The second fastening part 362 may include a fastening hole 362a for fastening the fastening member 370 to support opposite sides of the first fastening part 352 in the fastening direction of the fastening member 370.

The first rubber bushing 381 may be fastened to be fitted into a bushing coupling hole 352a provided on the first fastening part 352. The first fastening part 352 and the second fastening part 362 may be elastically supported through the first rubber bushing 381 in a state where the first fastening part 352 and the second fastening part 362 are coupled by the fastening member 370 therebetween. Therefore, the first rubber bushing 381 may elastically support the first fastening part 352 and the second fastening part 362 in the front-rear direction of the vehicle.

Accordingly, the first rubber bushing 381 may absorb vibrations depending on the motion of the wheels in the front-rear direction, and may prevent the first leaf springs 311 and the second leaf spring 312 from being separated or damaged by a load applied to the wheels in the front-rear direction.

Figure 6:
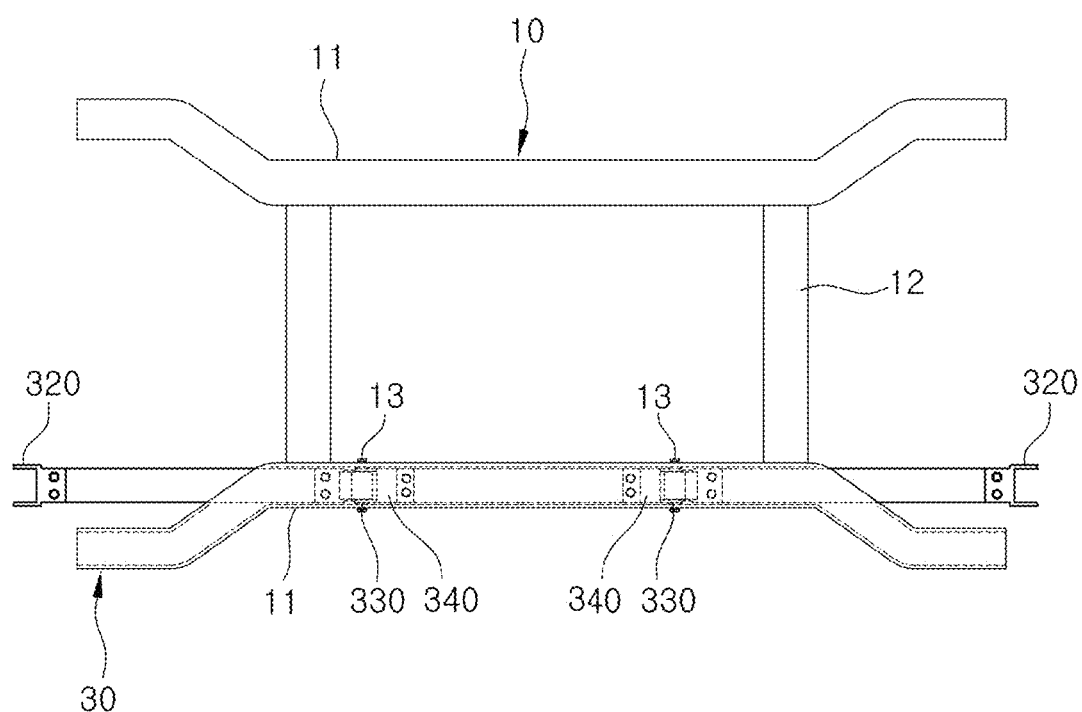
FIG. 6 is a plan view illustrating a state in which the vehicle suspension spring device is installed on a subframe according to an embodiment of the present disclosure.
Figure 7:
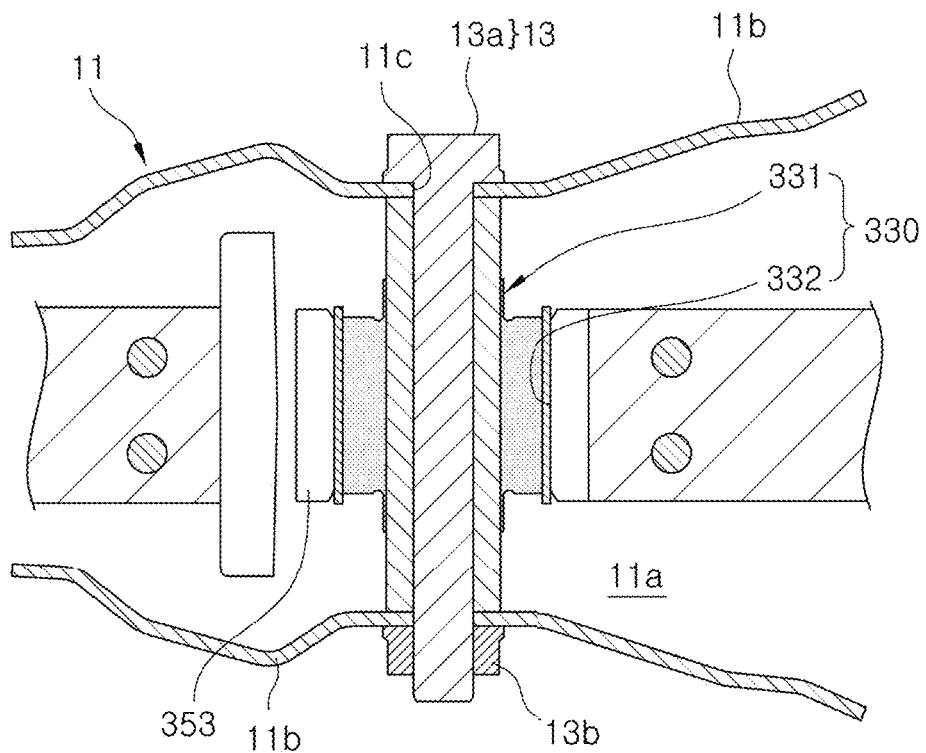
FIG. 7 illustrates a cross-sectional structure of a main part in FIG. 6.

As illustrated in FIGS. 6 and 7, the cross member 11 of the subframe 10 may have a hollow portion 11a therein along the longitudinal direction. The cross member 11 may be provided such that a bottom thereof is opened along the longitudinal direction.

The vehicle suspension spring device 30 may be accommodated in the hollow portion 11a so that the pair of connection parts 340 and a gap therebetween may be protected by the subframe 10.

The vehicle suspension spring device 30 may be coupled between opposite sidewalls 11b of the hollow portion 11a of the cross member 11 through the second coupling part 330 in a state where the pair of connection parts 340 and the gap therebetween are accommodated in the cross member 11.

Coupling holes 11c for coupling the rotation shaft 13 are formed on the opposite sidewalls 11b. The rotation shaft 13 may include a bolt 13a fastened to the coupling holes 11c and the second rubber bushing 331. Nuts 13b may be coupled to bolts 13a fastened to the opposite sidewalls 11b.

Therefore, the second rubber bushing 331 may elastically support the connection part 340 around the bushing coupling hole 332 and the subframe 10 to assist the vibration-absorbing action of the elastic body 380 that absorbs vibrations depending on the motion of the wheels in the front-rear direction.

In order to enable the first connection member 350 to be coupled to the sidewalls 11b of the cross member 11 through the central portion 353, the first connection member 350 may be provided such that a thickness of the central portion 353 is thicker than a thickness of the first fastening part 352 along a coupling direction of the rotation shaft 13.

Figure 8:
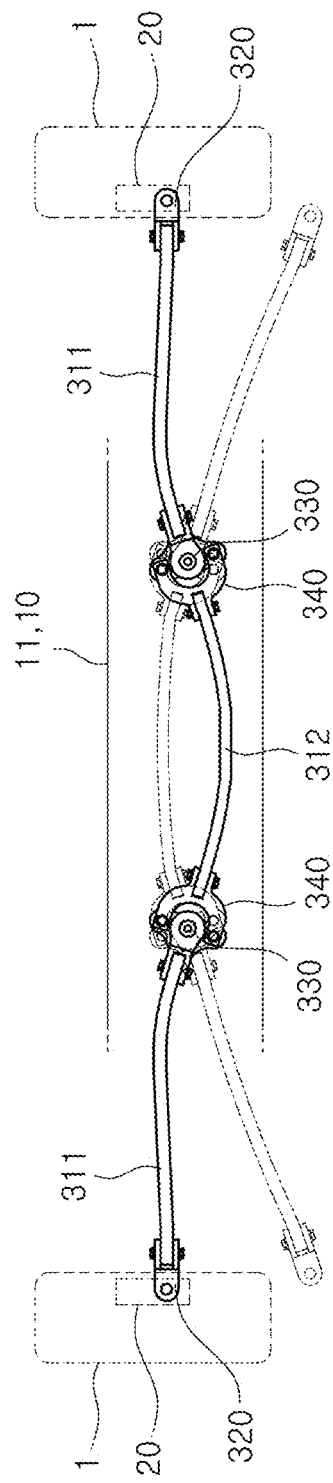
FIG. 8 illustrates an operation of the vehicle suspension system according to an embodiment of the present disclosure.

As illustrated in FIG. 8, in the vehicle suspension system configured as described above, when opposite wheels 1 of the vehicle are bumped or rebounded to a similar degree, the vehicle suspension spring device 30 may absorb vibrations applied to the vehicle body while the second leaf spring 312 and the pair of first leaf springs 311 are bent in opposite directions based on the second coupling parts 330.

Figure 9:
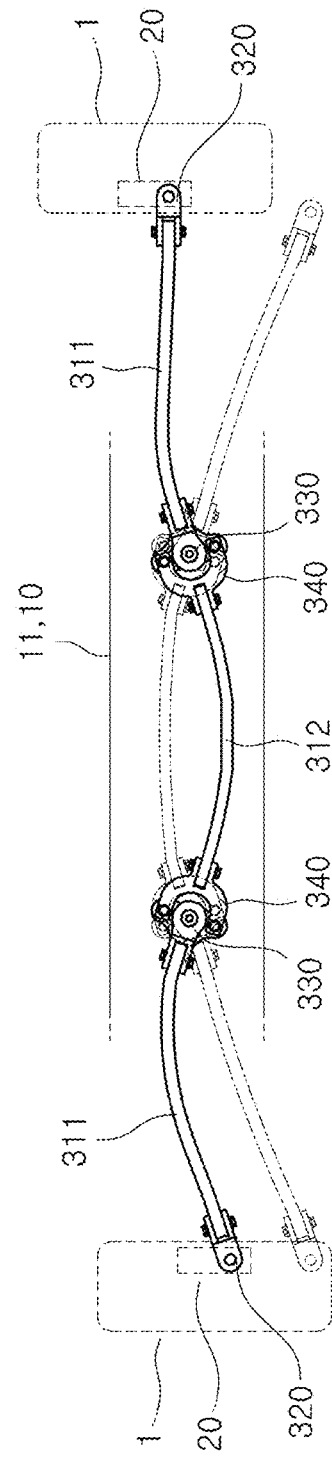
FIG. 9 illustrates another operation of the vehicle suspension system according to an embodiment of the present disclosure.

On the other hand, as illustrated in FIG. 9, when a phase difference between the opposite wheels 1 increases by excessive bumping of one wheel 1 as one of the wheels 1 is excessively bumped, the vehicle suspension spring device 30 may stabilize a posture of the vehicle body through a torsional elastic force generated as the second leaf spring 312 is twisted, and may absorb and block vibration transmitted to the vehicle body.

When vibrations occur due to the motion of the wheels 1 in the front-rear direction, the vehicle suspension spring device 30 may absorb the vibrations in the front-rear direction through the elastic body 380 and the rubber bushing 331 elastically supporting the connection members 350 and 360, and thus may prevent the first leaf springs 311 and the second leaf spring 312 from being separated or damaged by the load applied to the wheels 1 in the front-rear direction.

As is apparent from the above, according to an aspect of the present disclosure, a vehicle suspension spring device that can lower a height of a floor of a vehicle body and a vehicle suspension system having the same can be provided.

According to another aspect of the disclosure, a vehicle suspension spring device that can have a simplified configuration while effectively performing a vibration-absorbing action and a vehicle suspension system having the same can be provided.

What is claimed is:

1. A vehicle suspension spring device comprising:
   a leaf spring unit including a plurality of leaf springs disposed and connected in a lateral direction of a vehicle, and a connection part provided to connect the plurality of leaf springs;
   a pair of first coupling parts provided at opposite ends of the leaf spring unit in a longitudinal direction and rotatably coupled to a pair of axles on which opposite wheels of the vehicle are mounted; and
   a pair of second coupling parts provided at two points between the opposite ends of the leaf spring unit in the longitudinal direction to be rotatably coupled to a subframe of the vehicle, wherein a first coupling part of the pair of first coupling parts is provided at an outer end of an outermost leaf spring of the plurality of leaf springs, wherein a second coupling part of the pair of second coupling parts is provided between the plurality of leaf springs, wherein the connection part includes a pair of connection members provided at ends of the plurality of leaf springs corresponding to each other and coupled to each other, and a fastening member for coupling the connection members, wherein the fastening member is fastened in a front-rear direction of the vehicle to couple the connection members, wherein an elastic body is provided to elastically support the connection members in the front-rear direction of the vehicle, and includes a first rubber bushing installed in the connection part to support the fastening member, wherein a rotation shaft is coupled to the subframe in the front-rear direction of the vehicle, wherein the second coupling part includes a second rubber bushing provided to rotatably support the rotation shaft, and a bushing coupling hole provided on the leaf spring unit so that the second rubber bushing is coupled, and wherein the second rubber bushing elastically supports the leaf spring unit around the bushing coupling hole and the subframe.

2. The vehicle suspension spring device according to claim 1, wherein
the leaf spring unit includes a pair of first leaf springs disposed at the opposite ends in the longitudinal direction, and a second leaf spring provided to connect the pair of first leaf springs,
the first coupling part is provided at an outer end of the first leaf spring, and
the second coupling part is provided between the first leaf spring and the second leaf spring.

3. The vehicle suspension spring device according to claim 1, wherein the leaf spring is made of a fiber-reinforced composite material.

4. A vehicle suspension system comprising:
a subframe of a vehicle;
a pair of axles mounted on opposite wheels of the vehicle; and
a vehicle suspension spring device provided to connect the pair of axles and the subframe;
wherein the vehicle suspension spring device includes:
a leaf spring unit having a pair of first leaf springs, a second leaf spring provided to connect the pair of first leaf springs and disposed in a lateral direction of the vehicle, and a pair of connection parts provided to connect the first leaf springs and the second leaf spring;

a pair of first coupling parts provided at outer ends of the pair of first leaf springs to be rotatably coupled to the axle;
a pair of second coupling parts provided between the first leaf springs and the second leaf spring to be rotatably coupled to the subframe,
wherein a connection part of the pair of connection parts includes a pair of connection members provided at ends of the first leaf spring and the second leaf spring corresponding to each other and coupled to each other, and a fastening member for coupling the connection members,
wherein the fastening member is fastened in a front-rear direction of the vehicle to couple the connection members,
wherein an elastic body is provided to elastically support the connection members in the front-rear direction of the vehicle, and includes a first rubber bushing installed in the connection part to support the fastening member,
wherein a rotation shaft is coupled to the subframe in the front-rear direction of the vehicle, and
wherein the second coupling part includes a second rubber bushing provided to rotatably support the rotation shaft, and a bushing coupling hole provided on the connection part so that the second rubber bushing is coupled.

5. The vehicle suspension system according to claim 4, wherein
the second rubber bushing is provided at a central portion of the connection part, and
a plurality of the first rubber bushings is provided in the connection part around the second rubber bushing.

6. The vehicle suspension system according to claim 4, wherein the second rubber bushing elastically supports the connection part around the bushing coupling hole and the subframe.

7. The vehicle suspension system according to claim 4, wherein the first coupling part is coupled to a lower central portion of the axle.

8. The vehicle suspension system according to claim 4, wherein
the leaf spring unit includes a pair of connection parts provided to connect the pair of first leaf springs and the second leaf spring,
the subframe includes a cross member formed in the lateral direction of the vehicle,
the cross member has a hollow portion therein along a longitudinal direction, and
the vehicle suspension spring device is provided such that the pair of connection parts and a gap between the pair of connection parts are accommodated in the hollow portion.

* * * * *